United States Patent [19]
Gast, Jr. et al.

[11] Patent Number: 5,799,495
[45] Date of Patent: Sep. 1, 1998

[54] CONTAINER OXYGEN CONTROL SYSTEM FOR TRANSPORTING AND RIPENING PERISHABLE GOODS

[75] Inventors: William A. Gast, Jr., Mead, Wash.; Robert W. Herdeman, Loveland; Jorge E. Saenz, Cincinnati, both of Ohio

[73] Assignees: Nitec, Inc., Spokane, Wash.; Chiquita Brands, Inc., Cincinnati, Ohio

[21] Appl. No.: 741,263

[22] Filed: Oct. 30, 1996

[51] Int. Cl.$^6$ ............................................. F24F 3/16
[52] U.S. Cl. ................................. 62/78; 62/239
[58] Field of Search .................. 34/211, 218; 62/78, 62/239; 426/418, 419

[56] References Cited

U.S. PATENT DOCUMENTS

| | | | |
|---|---|---|---|
| 3,102,777 | 9/1963 | Bedrosian et al. | 62/78 X |
| 3,360,380 | 12/1967 | Bedrosian | 62/78 X |
| 4,642,996 | 2/1987 | Harris et al. | 62/78 |
| 4,833,892 | 5/1989 | Wassibauer et al. | 62/78 |
| 4,894,997 | 1/1990 | Urushizaki et al. | 62/78 |
| 4,961,322 | 10/1990 | Oguna et al. | 62/78 X |
| 4,987,745 | 1/1991 | Harris | 62/78 |
| 5,063,753 | 11/1991 | Woodruff | 62/239 |
| 5,127,233 | 7/1992 | Coffield | 62/78 |
| 5,249,428 | 10/1993 | Barbe et al. | 62/78 |
| 5,333,394 | 8/1994 | Herdeman et al. | 34/467 |
| 5,355,781 | 10/1994 | Liston et al. | 62/78 X |

*Primary Examiner*—Christopher Kilner
*Attorney, Agent, or Firm*—Lee & Hayes, PLLC

[57] ABSTRACT

A container oxygen control system includes multiple containers to hold perishable goods in a controlled ripening atmosphere composed primarily of nitrogen and oxygen. A first atmosphere control system controls the container atmosphere during the first transportation leg, such as from the place of harvest to a distribution port. The first atmosphere control system has a centralized nitrogen generator and multiple oxygen controllers which are provided for corresponding containers. The nitrogen generator generates a nitrogen enriched stream which is supplied to each oxygen controller. Each oxygen controller has an oxygen sensor to determine the oxygen content of the ripening atmosphere within the container. If the oxygen content remains above a preset threshold level, the oxygen controller injects the nitrogen enriched stream into the container at a constant rate to purge the container in a continuous manner. The container has an exhaust port to exhaust part of the ripening atmosphere from the container. If the oxygen content falls below the threshold level, however, the oxygen controller turns on a mixer to mix the nitrogen enriched stream with ambient air. This mixture is injected into the container to increase the oxygen content of the controlled ripening atmosphere. A second atmosphere control system controls the ripening atmosphere of the containers during a second transportation leg, such as from the port to the stores. The second atmosphere control system has multiple portable oxygen infusion units which mount directly to corresponding containers. The oxygen infusion units sense the oxygen content of the ripening atmosphere within the container, and selectively inject ambient air into the container to increase the oxygen content when it falls below a threshold level.

25 Claims, 7 Drawing Sheets

CONTAINER OXYGEN CONTROL SYSTEM FOR TRANSPORTING AND RIPENING PERISHABLE GOODS

TECHNICAL FIELD

This invention relates to container oxygen control systems for transporting fruits, vegetables, and other perishable goods in a controlled ripening environment.

BACKGROUND OF THE INVENTION

In the present era of world trade and managed distribution, consumers enjoy a wide assortment of fresh produce at their local grocery stores throughout the year. The fresh produce includes fruits and vegetables that are in season and out, harvested locally or grown overseas. At a given time of the year, a store in Omaha, Nebr. might have apples from New Zealand, bananas from Costa Rica, pineapples from Maui, lettuce from California, and corn from neighboring Nebraska counties. The convenience of year round fresh produce is accomplished by sophisticated planning and distribution networks which take unripened produce directly from harvest, timely ripen the produce, and transport the ripening produce to stores for sale.

It is well known that certain perishable produce can be maintained in fresher condition at refrigerated temperatures above freezing. Controlled atmospheres which inhibit rapid ripening and spoilage are also used to enhance freshness. It is therefore common to store and ship produce in refrigerated and/or controlled atmosphere structures to maintain the freshness, particularly in view of the large distances and long time spans often required for shipping, importation, and distribution.

Common controlled atmospheres are created within shipping or storage facilities by periodically flushing the enclosed environment with an inert gas, such as nitrogen. Due to the presence of the predominate inert gas, the controlled atmosphere has a small quantity of oxygen, thereby slowing the ripening process of the produce.

Consider the transportation of bananas, a representative imported fresh produce, from harvest to point of purchase. The bananas are harvested from trees in tropical habitats (e.g., Costa Rica) in an unripened condition. The bananas are placed on a large cargo ship and transported to a port in the United States, such as Los Angeles or Tampa Bay. The cargo ship has special chambers with controlled atmospheres designed to prevent the bananas from ripening. Once in the United States, the bananas are stored temporarily in large controlled atmosphere warehouses during importation procedures. From the warehouses, the bananas are transferred to a truck trailer that is specially designed to maintain a controlled atmosphere which inhibits ripening of the bananas.

The bananas are ported in the truck trailer to another warehouse facility for ripening. The ripening facility provides an environment conducive to controllably ripening the bananas. The environment is primarily comprised of nitrogen, with small parts of oxygen. To ripen the bananas, ethylene $C_2H_4$ is introduced into the controlled atmosphere. During the ripening, the bananas absorb oxygen and simultaneously release carbon dioxide $CO_2$, a process known as "respiration." When bananas are just about ripe, they are loaded onto refrigerated truck trailers and delivered to grocery stores for sale. By the time the bananas are displayed in the produce department, the bananas are ripe or slightly under ripe.

The inventors have developed a container oxygen control system that facilitates transportation of perishable produce from harvest to stores in a controlled atmosphere conducive to scheduled ripening.

SUMMARY OF THE INVENTION

A container oxygen control system includes multiple containers to hold perishable goods in route from the location of harvest to destination end-sellers, such as supermarkets and grocery stores. As an example, the containers are standard truck trailers that are suitable for transportation on freight ships when the produce is being shipped overseas, and for towing behind a semi truck when the produce is being carried over land. A controlled ripening atmosphere composed primarily of nitrogen and oxygen is developed and maintained within the containers.

The container oxygen control system has a first atmosphere control system which controls the ripening atmosphere of the containers during the first leg of a journey. The first atmosphere control system can be implemented on freight ships or in land-based storage facilities.

The first atmosphere control system has a centralized nitrogen generator and multiple oxygen controllers which are provided for corresponding containers. On the ship, each oxygen controller is mechanically mounted near its associated container; whereas, at a storage facility, the oxygen controller can be mounted to a wheel dolly or cart for temporary placement beside its associated container. The nitrogen generator generates a nitrogen enriched stream which is supplied to each oxygen controller.

Each oxygen controller is connected to its associated container by a pair of hoses, conduits, or other devices which provide fluid communication. One conduit is used to draw samples of the controlled atmosphere from the container. The oxygen controller has oxygen sensor to determine the oxygen content of the ripening atmosphere from the sample. If the oxygen content remains above a preset threshold level, the oxygen controller injects the nitrogen enriched stream through the second conduit into the container at a constant rate to purge the container in a continuous manner. The container has an exhaust port to exhaust part of the ripening atmosphere from the container.

If the oxygen content falls below the threshold level, however, the oxygen controller turns on a mixer to mix the nitrogen enriched stream with ambient air. This mixture is then injected into the container through the second conduit to increase the oxygen content of the controlled ripening atmosphere until it rises above the threshold level.

The container oxygen control system further has a second atmosphere control system which controls the ripening atmosphere of the containers during a second and last leg of the journey. Typically, this leg is very short (e.g., one-two days) and involves transporting the container by truck to local stores. The second atmosphere control system comprises multiple portable oxygen infusion units mounted to associated containers prior to towing the containers to the destination locations. Each portable oxygen infusion unit has a frame sized to mount directly onto the container and a pair of hoses or conduits to provide fluid communication into the controlled ripening atmosphere. The oxygen infusion unit extracts a sample of the ripening atmosphere from the container through one conduit and senses the oxygen content of the ripening atmosphere. If the oxygen content is above a threshold level, the oxygen infusing unit does nothing, except continue to monitor the oxygen content of the atmosphere. On the other hand, if the oxygen content falls below the threshold level, the oxygen infusing unit turns on a pump to inject ambient air into the container to increase the oxygen content of the ripening atmosphere.

By setting the threshold levels at various junctures of the journey, the container oxygen control system provides a ripening atmosphere that controllably ripens the produce according to a desired schedule suitable for the perishable produce.

DETAILED DESCRIPTION OF THE PREFERRED EMBODIMENT

Figure 1:
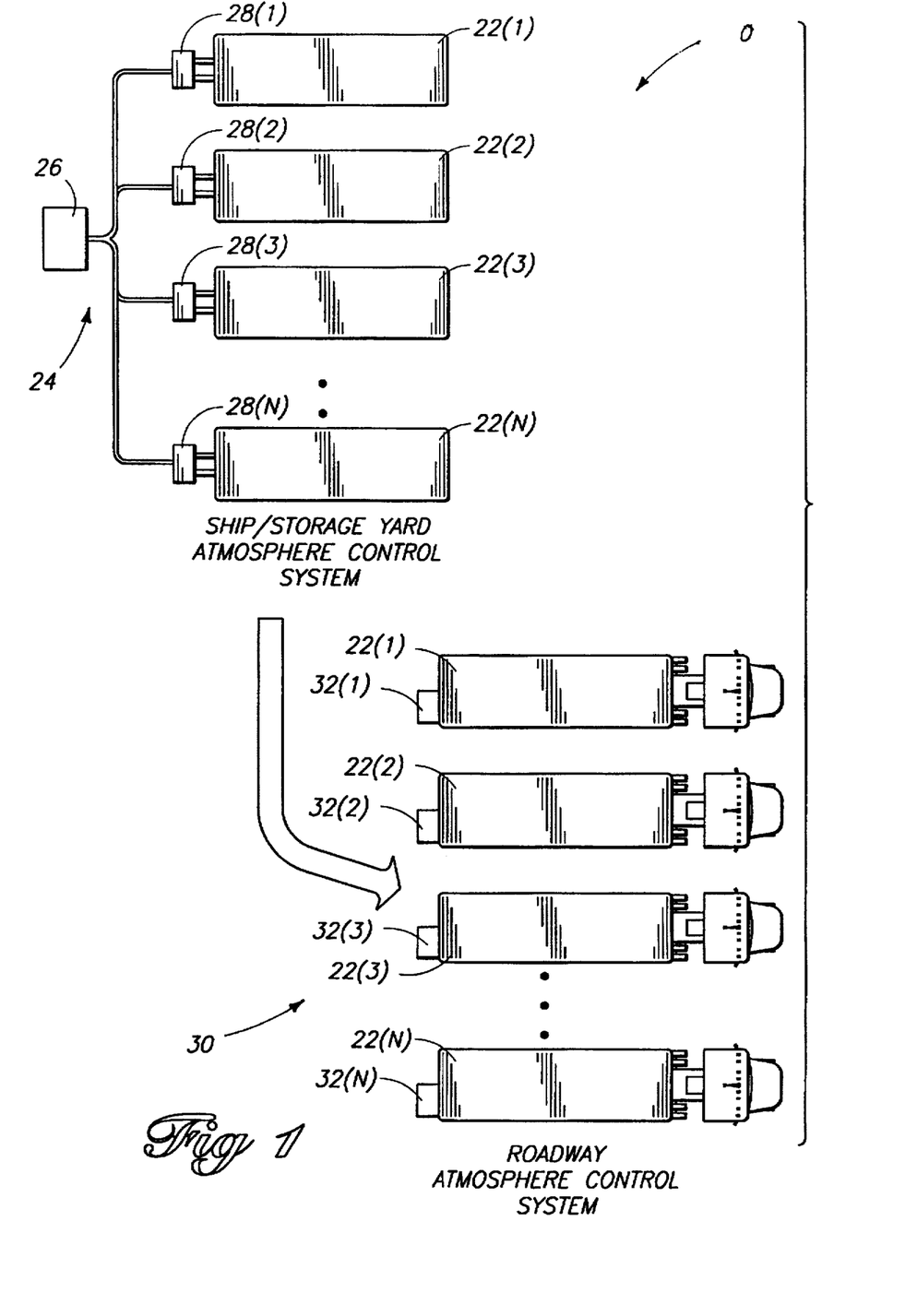
FIG. 1 is a diagrammatic illustration of a container oxygen control system according to an aspect of this invention.

FIG. 1 shows a container oxygen control system 20 for transporting perishable goods (e.g., fruits, vegetables, etc.) in a controlled ripening atmosphere from harvest to a destination location. The container oxygen control system 20 has multiple containers 22(1), 22(2), 22(3), ..., 22(N) to hold the perishable goods. The containers are shown as standard truck trailers.

The transportation of the perishable goods is divided into two legs. The first leg entails transporting the goods from the place of harvest or other origination point to an intermediary place. The first leg can be long (e.g., several days or weeks) depending upon the mode of transportation. When transporting bananas, for example, the first transportation leg involves loading containers filled with bananas onto a cargo ship at the producing country (e.g., Costa Rica) and hauling the containers over the ocean to the United States. When the cargo ship docks at its destination port, the containers 22(1)-22(N) are removed from the cargo ship and temporarily stored at the storage yard of the port.

The second transportation leg involves moving the containers individually from the intermediary place to their final destination. The second leg is typically very short (e.g., one-two days). In the banana example, the second transportation leg involves towing the containers from the ship yard to the stores or local distribution facilities where the bananas are unloaded.

The container oxygen control system 20 has two different atmosphere control systems for the different transportation legs. A first atmosphere control system 24 is used to control the ripening atmosphere of the containers during the first leg of the journey. The first atmosphere control system 24 is a stationary system, with one such system residing at an initial holding facility, one system residing on the cargo ship, or one system residing at the port storage facility.

The first atmosphere control system 24 has a centralized nitrogen generator which produces a nitrogen enriched stream. A "nitrogen enriched stream" is a gas stream which has more nitrogen, and less oxygen, than is found in ambient air. Ambient air is composed primarily of nitrogen (78%) and oxygen (20%). The remaining two percent consists of a number of gases including argon, carbon dioxide, neon, helium, krypton, xenon, and hydrogen. Ambient air also has minute quantities of impurities, such as water vapor, methane, carbon monoxide, and others. Accordingly, a nitrogen enriched stream is a gas stream comprising more than 78% nitrogen and less than 20% oxygen.

Multiple oxygen controllers 28(1), 28(2), 28(3), ..., 28(N) are connected in fluid communication via hoses or other conduits to the nitrogen generator 26 to receive the nitrogen enriched stream. One oxygen controller is provided for each container 22(1)-22(N). For a port-based system, the oxygen controllers are mounted to wheel carts or dollies which can be maneuvered by hand and conveniently placed beside the containers. For a ship-based system, the oxygen controllers are permanently mounted to panels or walls of the cargo ship beside their respective containers.

The oxygen controllers 28(1)-28(N) control the atmosphere within their associated containers 22(1)-22(N). More particularly, the oxygen controllers control an oxygen content within the container to provide a desired ripening atmosphere that is composed primarily of nitrogen and oxygen. During the first leg of the journey, the ripening atmosphere might be maintained within tight parameters to prevent or minimize ripening. An example ripening atmosphere during the first transportation leg might contain mostly nitrogen, approximately 1%–2% oxygen, and traces of other elements in air.

The oxygen controllers 28(1)-28(N) maintain the atmosphere within the container at these parameters. Each oxygen controller is connected in fluid communication with its respective container via a pair of hoses or conduits. The oxygen controller extracts samples of the container atmosphere through one conduit and continuously injects a purging gas into the container through the other conduit. The composition of the purging gas changes depending upon the oxygen content of the atmosphere samples. If the oxygen content is within the prescribed range, the purging gas stream consists of the nitrogen enriched stream received from the nitrogen generator 26. Conversely, if the oxygen content is below a certain threshold level, the purging gas stream consists of a mixture of the nitrogen enriched stream and ambient air to thereby increase the oxygen content of the container atmosphere.

The container oxygen control system 20 also has a second atmosphere control system 30 which is used to control the ripening atmosphere of the containers 22(1)-22(N) during the second and final transportation leg. This portion of the journey involves hauling the trailers by semi truck from the port to the destination stores. The second atmosphere control system 30 is a portable system that accompanies the trailers.

The second atmosphere control system 30 entails multiple portable oxygen infusion units 32(1), 32(2), 32(3), ..., 32(N) which are mounted directly to corresponding containers 22(1), 22(2), 22(3), ..., 22(N), respectively. The oxygen infusion units 32(1)-32(N) control the atmosphere within their associated containers 22(1)-22(N) by monitoring and controlling the oxygen content within the container. During the second leg of the journey, the oxygen infusion units maintain a ripening with a slightly increased amount of oxygen, say 2%–4%, which permits a slow and controlled ripening environment.

Each portable oxygen infusion unit is connected in fluid communication with its container via a pair of hoses or conduits. The oxygen infusion unit extracts samples of the container atmosphere through one conduit and occasionally injects ambient air into the container through the other conduit. The oxygen infusion unit selectively injects the ambient air depending upon the oxygen content within the container atmosphere.

The container oxygen control system 20 provides a ripening atmosphere that controllably ripens the produce according to a desired schedule. The operators control the ripening process by setting the threshold levels of the oxygen controllers 28(1)–28(N) and portable oxygen infusion units 32(1)–32(N) at various junctures of the journey. As an example, the container oxygen control system 20 can be configured to ripen produce according to the techniques described in U.S. Pat. No. 5,460,841, entitled "Process for Ripening Bananas and other Produce," which issued Oct. 24, 1995, and is assigned to Chiquita Brands, Inc. This '841 patent is hereby incorporated by reference.

Figure 2:
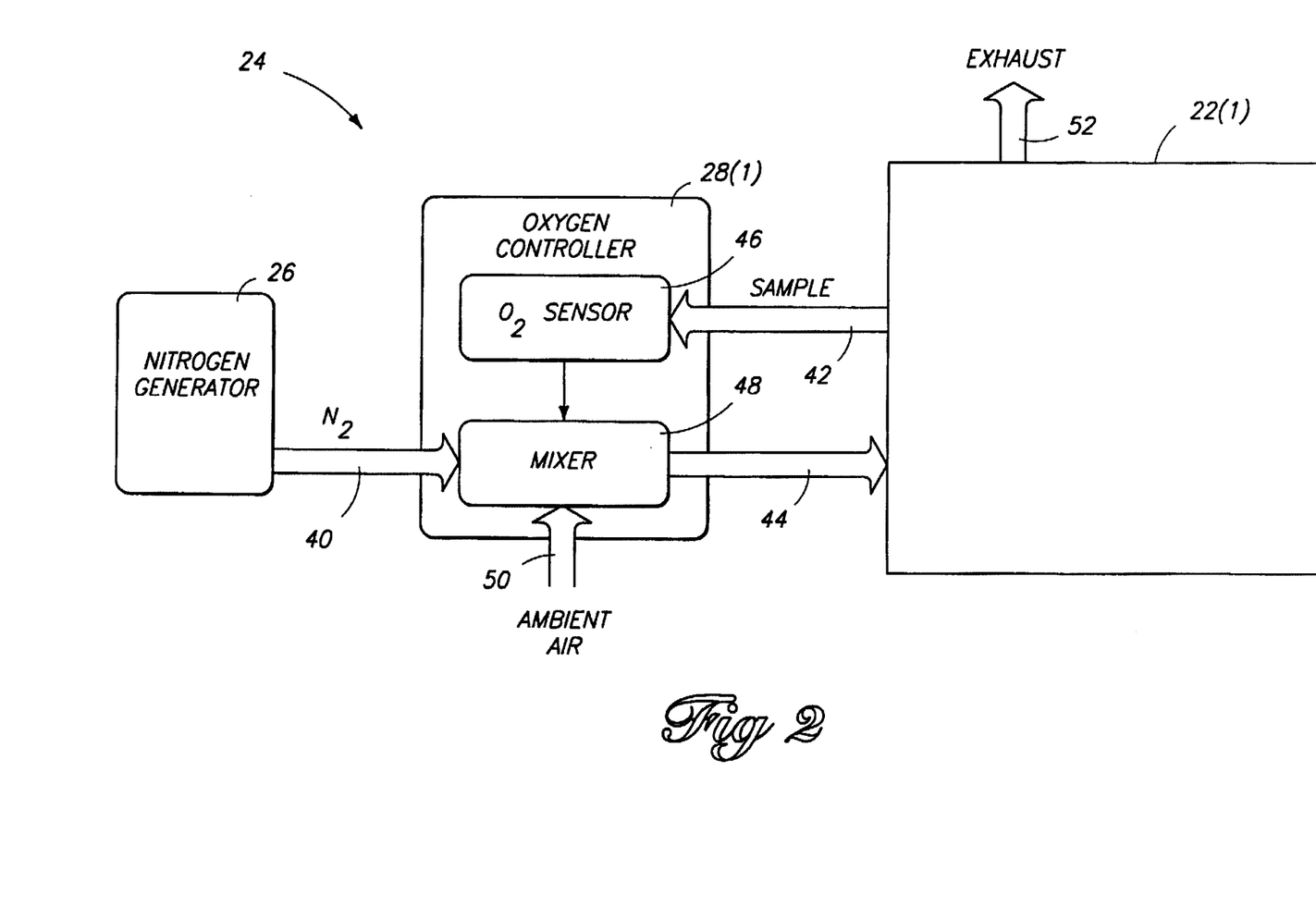
FIG. 2 is a block diagram of a first atmosphere control system of the container oxygen control system.

FIG. 2 shows the first atmosphere control system 24 in more detail and illustrates its operation in conjunction with a single container 22(1). The atmosphere control system 24 includes the nitrogen generator 26 which generates a nitrogen enriched stream and supplies that $N_2$ stream through a conduit 40.

The oxygen controller 28(1) is connected to receive the $N_2$ stream from conduit 40. The oxygen controller 28(1) is also connected in fluid communication with the container 22(1) via conduits 42 and 44. The first conduit 42 is used to extract a sample of the ripening atmosphere from the container 22(1). The oxygen controller 28(1) has an oxygen sensor 46 to determine the oxygen content of the atmosphere from the sample. The oxygen sensor 46 is configured to compare the oxygen content from the sample with a preset threshold level, and to generate a control signal when the oxygen content falls below the threshold level.

The oxygen controller 28(1) has a mixer 48 which is electronically coupled to receive the control signal from the oxygen sensor 46. Depending upon the control signal, the mixer 48 alternately outputs through conduit 44 the nitrogen enriched stream received from the nitrogen generator 26 or a mixture of the nitrogen enriched stream and ambient air received via an intake 50. The oxygen controller preferably supplies the $N_2$ stream or mixture at an approximately constant flow rate to continuously purge the ripening atmosphere within the container 22(1). The container 22(1) is equipped with an exhaust port 52 to continuously exhaust part of the ripening atmosphere from the container at approximately the same constant flow rate. The continuous purge helps maintain the desired ripening environment within the container.

One suitable container that can be used in conjunction with this invention is described in U.S. Pat. No. 5,333,394, entitled "Controlled Atmosphere Container System for Perishable Products," which issued Aug. 2, 1994, in the name of Robert W. Herdeman et al., and is assigned to Chiquita Brands, Inc. This '394 patent is hereby incorporated by reference.

According to an aspect of this invention, the sample conduit 42 is heated using an electrical heating element. In some low temperature environments, the atmosphere sample extracted from the container might hit the cold external climate and freeze in the hose. The container atmosphere is typically at a high humidity, and hence the moisture content crystallizes in the extraction conduit 42 during extraction. To prevent this freeze up, an electrical conducting element powered by a power supply at the oxygen controller generates sufficient heat to warm the conduit 42.

Figure 3:
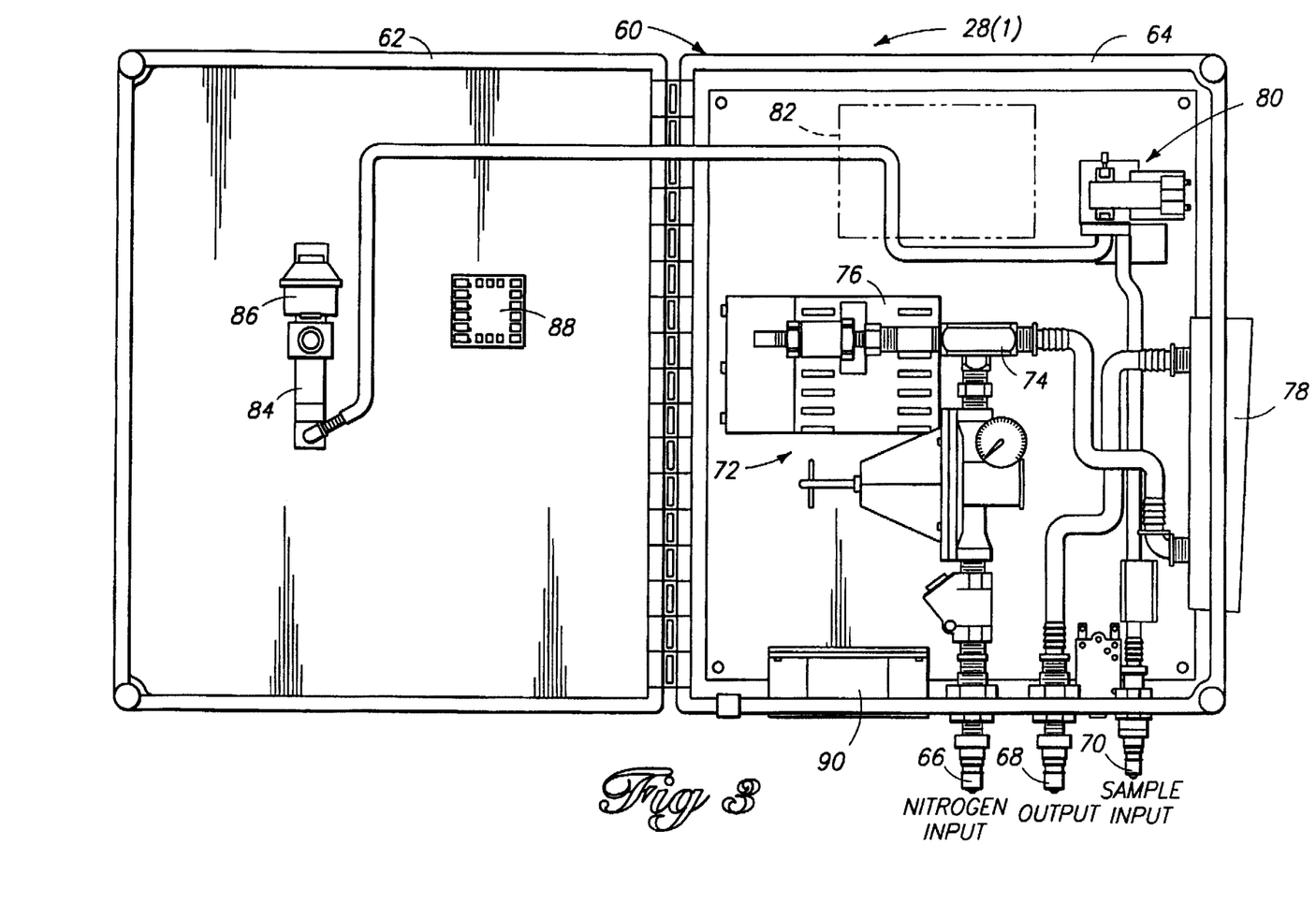
FIG. 3 is a diagrammatic illustration of an exemplary implementation of an oxygen controller used in the first atmosphere control system.

FIG. 3 shows an example implementation of the oxygen controller 28(1). It has a protective housing 60 with a front door 62 attached by a hinge to a rear structure 64 to alternately expose or enclose the operational components. The oxygen controller 28(1) has a nitrogen input 66 which connects to a hose carrying the nitrogen enriched stream, an output 68 which connects to a hose used to inject the gas stream into the container, and a sample input 70 which connects to a hose carrying the sample extracted from the container. The nitrogen input 66 is connected via tubing to a mixer 72. The mixer 72 includes a T-joint 74 and a compressor 76 which intakes ambient air and compresses it. The mixer 72 is connected via tubing to a flow meter 78 which meters a constant flow rate for the gas stream ejected through output 68.

The sample input 70 is connected via tubing to a sample pump 80 which extracts by suction a sample of the atmosphere from within the container. The sample is passed by tubing through a heater 82 to a sample flow meter 84 and to an oxygen sensor 86. The oxygen sensor 86 senses the oxygen content from the sample in relation to a threshold level entered by the operator. An electronic controller 88 outputs a mixer control signal which turns on the mixer 72 (or more particularly, the compressor 76) when the oxygen content falls below the threshold level and turns off the mixer 72 when the oxygen content is above or equal to the threshold level. When the mixer 72 is on, the compressor 76 draws in ambient air, mixes the air with the nitrogen enriched stream in T-joint 74, and injects the mixture into the container to raise the oxygen content within the ripening atmosphere. When the mixer 72 is off, the nitrogen enriched stream passes directly on through to the container.

The oxygen controller 28(1) might additionally include other components, such as a thermostat (not shown), vent fan 90, circuit breaker (not shown), and the like, but these components are not described in detail.

Figure 4:
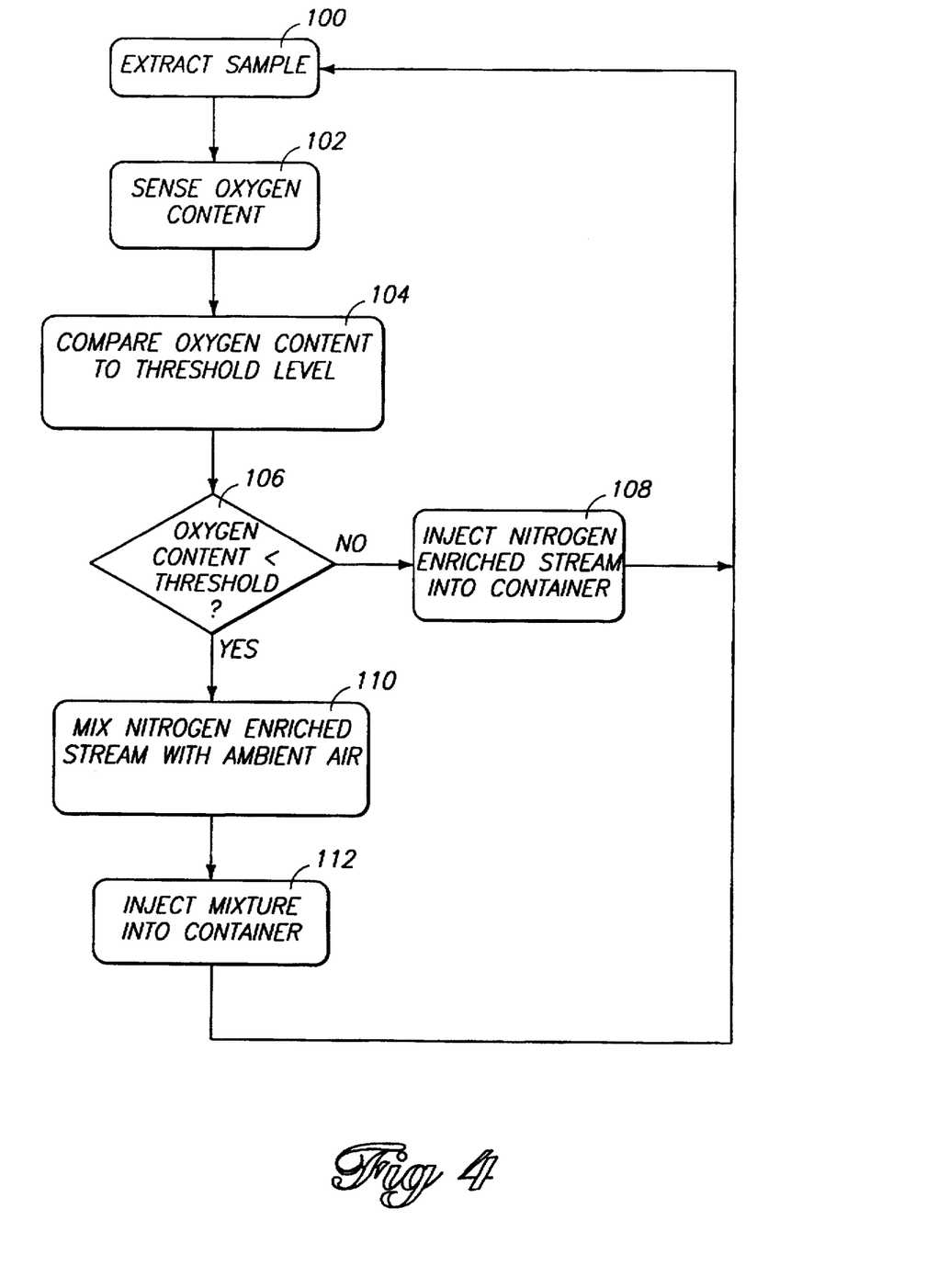
FIG. 4 is a flow diagram showing steps in a method for operating the oxygen controller to control oxygen content in a ripening atmosphere.

FIG. 4 shows the control methodology implemented by the oxygen controller 28(1). The steps in this method are explained with reference to FIG. 2. At step 100, the oxygen controller 28(1) extracts an atmosphere sample from the container 22(1). The oxygen sensor 46 senses an oxygen content contained within the sample as a representation of the oxygen content in the ripening atmosphere (step 102). The oxygen controller 28(1) compares the oxygen content to a threshold level, such as 1% oxygen (step 104). If the oxygen content is not below this threshold level (i.e., the "no" branch from step 106), the oxygen controller 28(1) injects the nitrogen enriched stream into the container 22(1) at an approximately constant flow rate (step 108). Conversely, if the oxygen content is below the threshold level (i.e., the "yes" branch from step 106), the oxygen controller 28(1) mixes the nitrogen enriched stream with ambient air (step 110) and injects the mixture into the container 22(1) at an approximately constant flow rate (step 112).

The control is continuous to maintain the oxygen content at the desired threshold level within the container. By injecting the nitrogen enriched stream or mixture at a constant rate, the oxygen controller continuously purges the container with a fresh gas supply.

Figure 5:
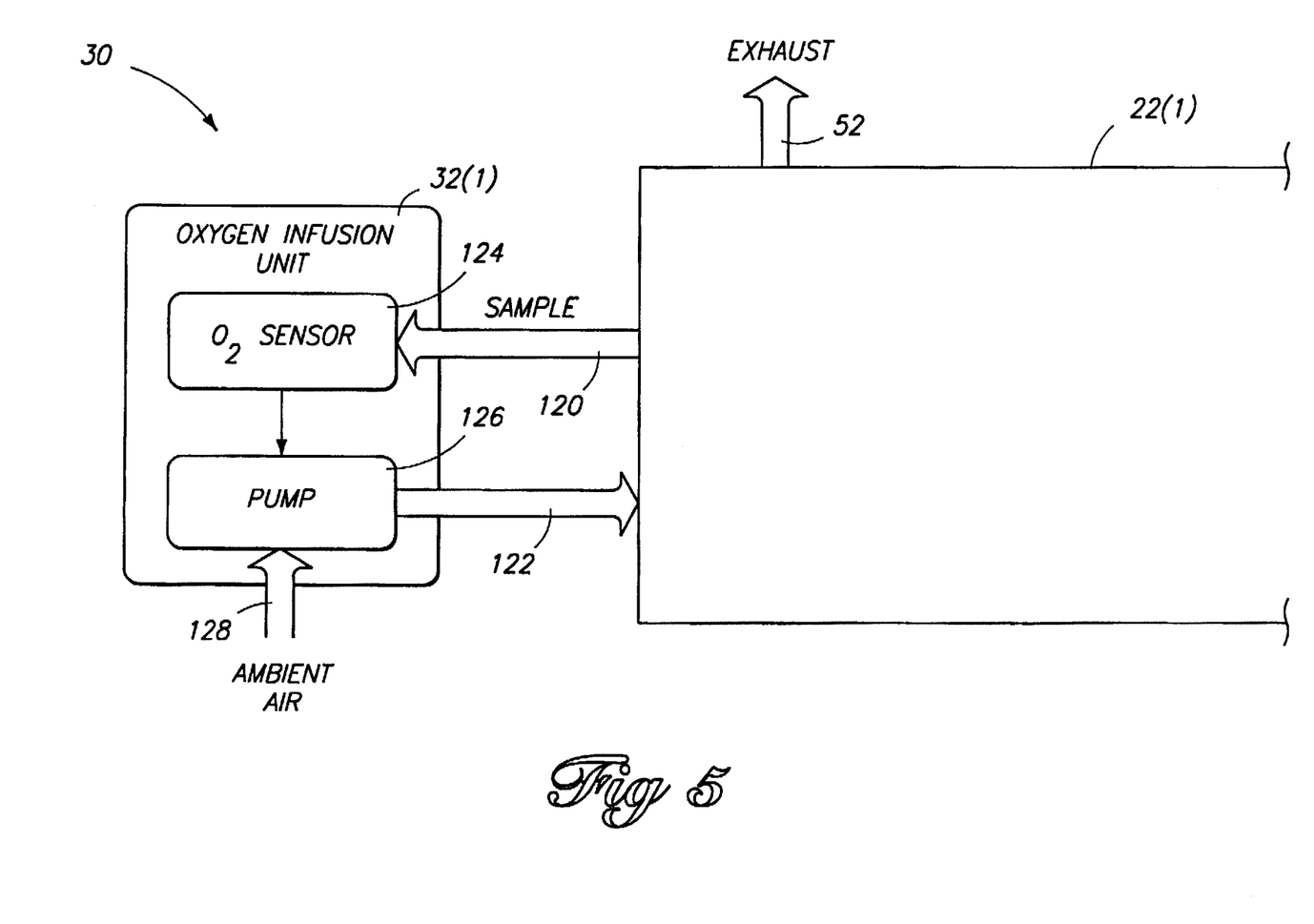
FIG. 5 is a block diagram of a second atmosphere control system of the container oxygen control system.

FIG. 5 shows the second atmosphere control system 30 in more detail and illustrates its operation in conjunction with the same container 22(1). The atmosphere control system 30 comprises the portable oxygen infusion unit 32(1) which is bolted to the trailer container 22(1). The portable oxygen infusion unit is connected in fluid communication with the container 22(1) via conduits 120 and 122. The first conduit 122 is used to extract a sample of the ripening atmosphere from the container 22(1). The oxygen infusion unit 32(1) has an oxygen sensor 124 to determine the oxygen content of the sampled atmosphere. The oxygen sensor 124 compares the oxygen content from the sample with a preset threshold level (e.g., 2%–4%), and generates a control signal when the oxygen content falls below the threshold level.

The oxygen infusion unit 32(1) has a pump 126 which is electronically coupled to receive the control signal from the oxygen sensor 124. The control signal turns on or off the pump 126. When the pump 126 is off, the oxygen infusion unit remains idle and simply continues to monitor the oxygen content. On the other hand, when the pump is turned on, it pumps ambient air received from an intake 128 out through conduit 122 and into the container 22(1). The oxygen infusion unit 32(1) preferably pumps the air into the container at an approximately constant flow rate.

Figure 6:
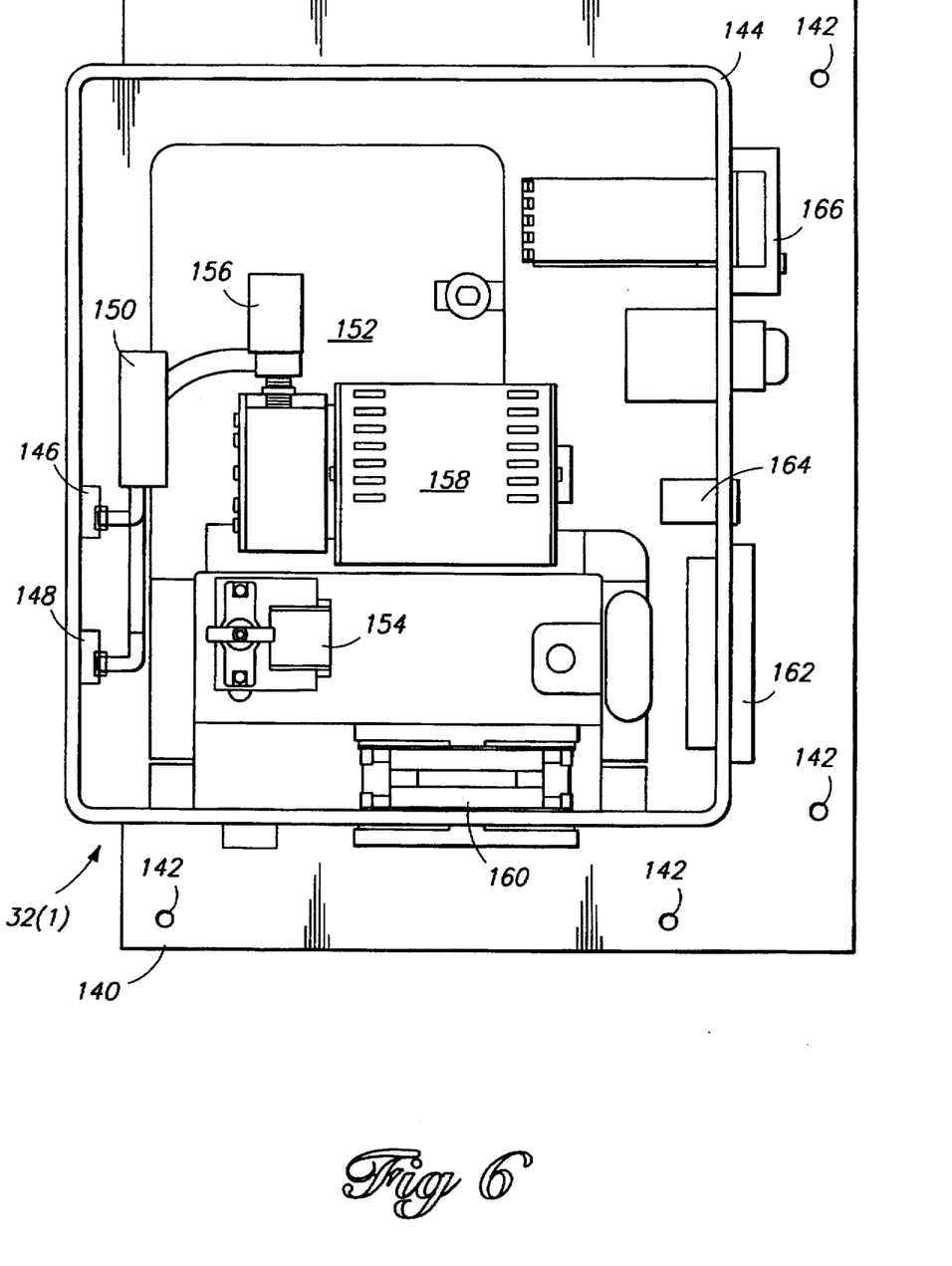
FIG. 6 is a diagrammatic illustration of an exemplary implementation of a portable oxygen infusion unit used in the second atmosphere control system.

FIG. 6 shows an example implementation of the portable oxygen infusion unit 32(1). It has a mounting frame 140 sized to fit standard containers and formed of a rigid material (e.g., steel). The mounting frame 140 has four apertures 142 which are sized and spaced to align and fit with an existing bolt arrangement on the front end of a standard trailer. The operator simply bolts the portable oxygen infusion unit 32(1) to the trailer using the frame 140. The oxygen infusion unit 32(1) has a protective housing 144 attached to the frame 140 to protect the operational components.

The oxygen controller 32(1) has a sample input 146 which connects to a hose carrying the sample extracted from the container and an output 148 which connects to a hose used to inject the air into the container. The sample input 146 is connected via tubing to a filter 150 and to an oxygen sensor 152. The sample is drawn into the sample input 146 via a sample pump 154. The oxygen sensor 152 senses the oxygen content from the sample in relation to a threshold level entered by the operator. The oxygen sensor 152 generates a control signal when the oxygen content falls below the threshold level.

The oxygen infusion unit 32(1) has an air intake and filter 156 and a pump 158. The pump 158 is electronically connected to be turned on or off by the control signal from the oxygen sensor 152. The pump 158 is occasionally turned on by the oxygen sensor 152 to pump the ambient air out through the output 148 and into the container. In an alternative implementation, an external compressed air supply may be substituted for pump 158 to introduce ambient air into the container.

The oxygen infusion unit 32(1) might additionally include other components, such as a cooling fan 160, a sample flow meter 162, an hour gauge 164, and various user input controls 166, but these components are not described in detail.

Figure 7:
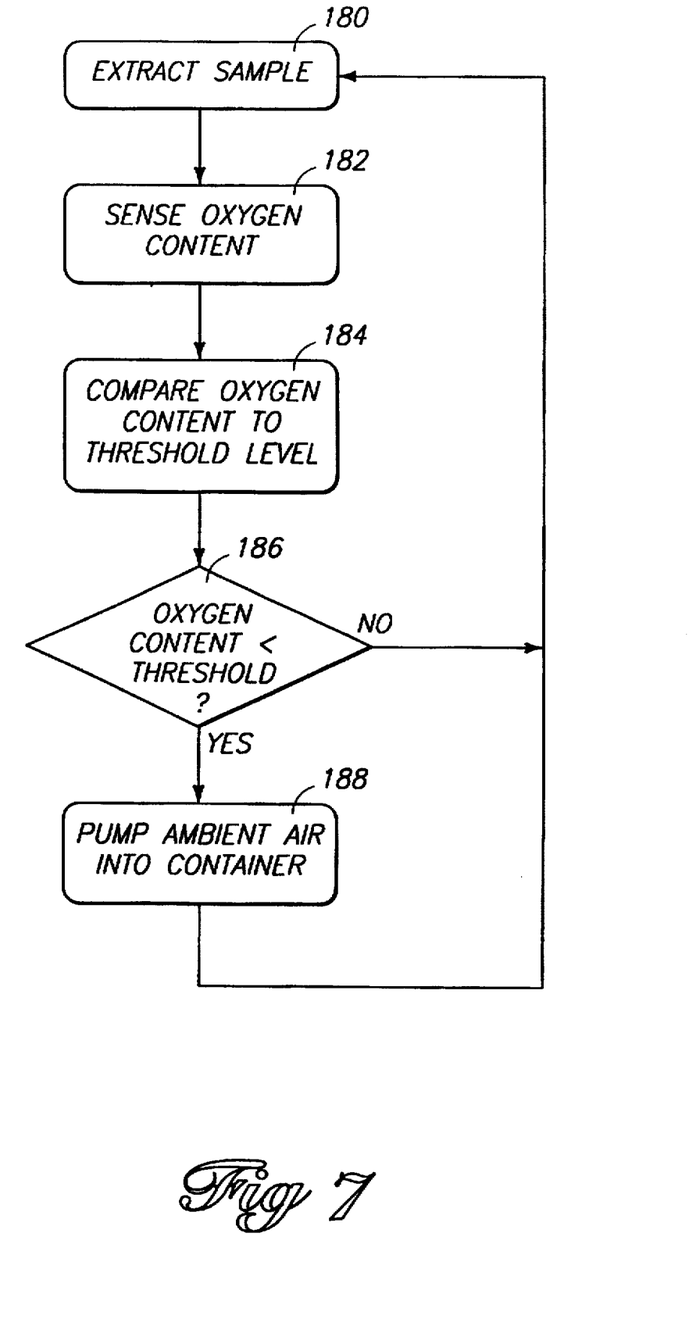
FIG. 7 is a flow diagram showing steps in a method for operating the oxygen infusion unit to control oxygen content in a ripening atmosphere.

FIG. 7 shows the control methodology implemented by the oxygen infusion unit 32(1). The steps in this method are explained with reference to FIG. 5. At step 180, the oxygen infusion unit 32(1) extracts an atmosphere sample from the container 22(1). The oxygen sensor 124 senses an oxygen content contained within the sample (step 182) and compares the oxygen content to a threshold level, such as 2%–4% oxygen (step 184). If the oxygen content is not below this threshold level (i.e., the "no" branch from step 186), the oxygen infusion unit 32(1) remains idle and continues to monitor the oxygen content. However, if the oxygen content is below the threshold level (i.e., the "yes" branch from step 186), the oxygen infusion unit 32(1) pumps or otherwise introduces ambient air into the container 22(1) at an approximately constant flow rate (step 188).

The container oxygen control system is advantageous in that it maintains a desired ripening atmosphere within the produce container along each leg of the journey from harvest to end seller. The produce may be shipped in an unripened condition, and timely ripened in route, so that it arrives at the store shelves in a near ripened or fully ripened condition.

In compliance with the patent statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A system for controlling a ripening atmosphere composed primarily of nitrogen and oxygen, comprising:
   a nitrogen generator to generate a nitrogen enriched stream;
   at least one oxygen controller connected to receive the nitrogen enriched stream from the nitrogen generator, the oxygen controller continuously injecting the nitrogen enriched stream into the ripening atmosphere at an approximately constant rate; and
   the oxygen controller sensing an oxygen content of the ripening atmosphere and selectively mixing the nitrogen enriched stream with ambient air before injection into the ripening atmosphere to controllably adjust the oxygen content in the ripening atmosphere.

2. A system as recited in claim 1, wherein the oxygen controller compares the sensed oxygen content to a threshold level and when the sensed oxygen content is below a threshold level, mixes the nitrogen enriched stream with the ambient air.

3. A system as recited in claim 1, further comprising multiple oxygen controllers for controlling corresponding ripening atmospheres which are independent of one another, the multiple oxygen controllers being connected to receive the nitrogen enriched stream from the nitrogen generator.

4. A system for controlling a ripening atmosphere composed primarily of nitrogen and oxygen, comprising:
   a nitrogen generator to generate a nitrogen enriched stream;
   at least one oxygen controller connected to receive the nitrogen enriched stream from the nitrogen generator, the oxygen controller injecting the nitrogen enriched stream into the ripening atmosphere;
   a heated conduit connected to carry samples of the ripening atmosphere to the oxygen controller for sensing; and
   the oxygen controller sensing an oxygen content of the ripening atmosphere and selectively mixing the nitrogen enriched stream with ambient air before injection into the ripening atmosphere to controllably adjust the oxygen content in the ripening atmosphere.

5. A container oxygen control system, comprising:
   multiple containers to hold perishable goods in a controlled ripening atmosphere composed primarily of nitrogen and oxygen;
   a nitrogen generator to generate a nitrogen enriched stream; and multiple oxygen controllers for corresponding ones of the containers, each oxygen controller being connected to receive the nitrogen enriched stream from the nitrogen generator and to inject continuously the nitrogen enriched stream into the container at an approximately constant rate, each oxygen controller sensing an oxygen content of the ripening atmosphere within the corresponding container and selectively mixing the nitrogen enriched stream with ambient air before injection into the container to controllably adjust the oxygen content of the ripening atmosphere.

6. A container oxygen control system as recited in claim 5, wherein said each oxygen controller compares the sensed oxygen content to a threshold level and when the sensed oxygen content is below a threshold level, mixes the nitrogen enriched stream with the ambient air.

7. A container oxygen control system as recited in claim 5, wherein individual containers are equipped with an exhaust port to exhaust the ripening atmosphere from the container.

8. A container oxygen control system, comprising:
multiple containers to hold perishable goods in a controlled ripening atmosphere composed primarily of nitrogen and oxygen;
a nitrogen generator to generate a nitrogen enriched stream;
multiple oxygen controllers for corresponding ones of the containers, each oxygen controller being connected to receive the nitrogen enriched stream from the nitrogen generator and to inject the nitrogen enriched stream into the container at an approximately constant rate, each oxygen controller sensing an oxygen content of the ripening atmosphere within the corresponding container and selectively mixing the nitrogen enriched stream with ambient air before injection into the container to controllably adjust the oxygen content of the ripening atmosphere; and
individual containers are equipped with an exhaust port to exhaust the ripening atmosphere from the container at approximately said constant rate to continuously purge the container.

9. A container oxygen control system, comprising:
multiple containers to hold perishable goods in a controlled ripening atmosphere composed primarily of nitrogen and oxygen;
a first atmosphere control system for controlling the ripening atmosphere of the containers during a first leg of transportation, the first atmosphere control system comprising a nitrogen generator to generate a nitrogen enriched stream and multiple oxygen controllers for corresponding ones of the containers, each oxygen controller being connected to receive the nitrogen enriched stream from the nitrogen generator and to inject the nitrogen enriched stream into the container, each oxygen controller sensing an oxygen content of the ripening atmosphere within the corresponding container and selectively mixing the nitrogen enriched stream with ambient air before injection into the container to controllably adjust the oxygen content of the ripening atmosphere; and
a second atmosphere control system for controlling the ripening atmosphere of the containers during a second leg of transportation, the second atmosphere control system comprising multiple portable oxygen infusion units for corresponding ones of the containers, each portable oxygen infusion unit having a frame for mounting to a corresponding container, an oxygen sensor to sense the oxygen content of the ripening atmosphere within the corresponding container, and a pump to selectively inject ambient air into the container to adjust the oxygen content of the ripening atmosphere.

10. A container oxygen control system as recited in claim 9, wherein said each oxygen controller compares the sensed oxygen content to a threshold level and when the sensed oxygen content is below a threshold level, mixes the nitrogen enriched stream with the ambient air.

11. A container oxygen control system as recited in claim 9, wherein said each oxygen controller continuously injects the nitrogen enriched stream into the container at an approximately constant rate.

12. A container oxygen control system as recited in claim 9, wherein individual containers are equipped with an exhaust port to exhaust the ripening atmosphere from the container.

13. A container oxygen control system as recited in claim 9, wherein:
said each oxygen controller injects the nitrogen enriched stream into the container at an approximately constant rate; and
individual containers are equipped with an exhaust port to exhaust the ripening atmosphere from the container at approximately said constant rate to continuously purge the container.

14. A container oxygen control system as recited in claim 9, wherein said each portable oxygen infusion unit compares the oxygen content to a threshold level and when the oxygen content is below a threshold level, activates the pump to inject ambient air into the container.

15. An oxygen controller for controlling an oxygen content in an atmosphere composed primarily of nitrogen and oxygen, comprising:
a nitrogen input to receive a nitrogen enriched stream;
a sample input to receive a sample of the atmosphere;
an oxygen sensor to determine the oxygen content of the atmosphere from the sample;
an air intake to receive ambient air;
a mixer in fluid communication with the nitrogen input and the air intake, the mixer being responsive to the oxygen sensor to provide a gas stream comprising one of (1) the nitrogen enriched stream, or (2) a mixture of the nitrogen enriched stream and the ambient air from the air intake; and
an output in fluid communication with the mixer to output the gas stream at an approximately constant rate for input into the atmosphere.

16. An oxygen controller as recited in claim 15, wherein:
the oxygen sensor is configured to compare the oxygen content from the sample with a threshold level, and to generate a control signal when the oxygen content falls below the threshold level; and
the mixer is configured to mix the nitrogen enriched stream and the ambient air to form the gas stream in response to the control signal from the oxygen sensor.

17. An oxygen controller for controlling an oxygen content in an atmosphere composed primarily of nitrogen and oxygen, comprising:
a nitrogen input to receive a nitrogen enriched stream;
a sample input to receive a sample of the atmosphere;
a heated conduit connected to the sample input to carry the atmosphere sample;

an oxygen sensor to determine the oxygen content of the atmosphere from the atmosphere sample;

an air intake to receive ambient air;

a mixer in fluid communication with the nitrogen input and the air intake, the mixer being responsive to the oxygen sensor to provide a gas stream comprising one of (1) the nitrogen enriched stream, or (2) a mixture of the nitrogen enriched stream and the ambient air from the air intake; and an output in fluid communication with the mixer to output the gas stream for input into the atmosphere.

18. A controlled atmosphere container unit for storing perishable goods in a ripening atmosphere composed primarily of nitrogen and oxygen, comprising:

a container; and an oxygen controller connected in fluid communication with the container to extract samples of the ripening atmosphere from within the container and to inject a gas stream into the container at an approximately constant rate, the oxygen controller having an oxygen sensor to determine an oxygen content of the ripening atmosphere from the sample, the oxygen controller also having a nitrogen input to receive a nitrogen enriched stream, an air intake to draw in ambient air, and a mixer to mix the nitrogen enriched stream and the ambient air in an event that the oxygen sensor determines that the oxygen content of the ripening atmosphere is below a threshold level, wherein the gas stream injected into the container by the oxygen controller comprises one of the nitrogen enriched stream or a mixture of the nitrogen enriched stream and the ambient air.

19. A controlled ripening container unit as recited in claim 18, wherein the container has an exhaust port to exhaust the ripening atmosphere.

20. A controlled ripening container unit as recited in claim 18, wherein the container has an exhaust port to exhaust the ripening atmosphere from the container at approximately said constant rate to continuously purge the container.

21. A controlled atmosphere container unit for storing perishable goods in a ripening atmosphere composed primarily of nitrogen and oxygen, comprising:

a container;

an oxygen controller connected in fluid communication with the container to extract samples of the ripening atmosphere from within the container and to inject a gas stream into the container, the oxygen controller having an oxygen sensor to determine an oxygen content of the ripening atmosphere from the sample, the oxygen controller also having a nitrogen input to receive a nitrogen enriched stream, an air intake to draw in ambient air, and a mixer to mix the nitrogen enriched stream and the ambient air in an event that the oxygen sensor determines that the oxygen content of the ripening atmosphere is below a threshold level, wherein the gas stream injected into the container by the oxygen controller comprises one of the nitrogen enriched stream or a mixture of the nitrogen enriched stream and the ambient air; and a heated conduit connected between the container and oxygen controller to carry the samples of the ripening atmosphere.

22. A portable oxygen infusion unit for controlling an oxygen content in a ripening atmosphere within a container, the ripening atmosphere being composed primarily of nitrogen and oxygen, the portable oxygen infusion unit comprising:

a frame sized to mount to the container;

a sample input to receive a sample of the ripening atmosphere from the container;

an oxygen sensor to determine the oxygen content of the ripening atmosphere from the sample;

an air intake to draw in ambient air; and an air injection unit to selectively inject the ambient air into the container to adjust the oxygen content of the ripening atmosphere when the oxygen sensor determines that the oxygen content of the ripening atmosphere is below a threshold level.

23. A method for controlling an atmosphere composed primarily of nitrogen and oxygen, comprising the following steps:

receiving a nitrogen enriched stream;

injecting the nitrogen enriched stream into a controlled atmosphere at an approximately constant rate;

sensing an oxygen content of the controlled atmosphere; and in an event that the sensed oxygen content is below a threshold level mixing the nitrogen enriched stream with ambient air to form a composite stream and injecting the composite stream into the controlled atmosphere.

24. A method as recited in claim 23, further comprising the step of exhausting the nitrogen and oxygen from the controlled atmosphere.

25. A method for controlling an atmosphere composed primarily of nitrogen and oxygen, comprising the following steps:

receiving a nitrogen enriched stream;

continuously injecting the nitrogen enriched stream into a controlled atmosphere at an approximately constant rate;

exhausting the nitrogen and oxygen from the controlled atmosphere concurrently with said injecting step;

receiving a nitrogen enriched stream;

sensing an oxygen content of the controlled atmosphere; and in an event that the sensed oxygen content is below a threshold level, mixing the nitrogen enriched stream with ambient air to form a composite stream and injecting the composite stream into the controlled atmosphere.

* * * * *